Jan. 27, 1931.   B. S. TUBMAN   1,790,333
REAR GLARE GUARD
Filed Feb. 27, 1929    2 Sheets-Sheet 1

Benjamin S. Tubman
INVENTOR
BY Victor J. Evans
ATTORNEY

Jan. 27, 1931.   B. S. TUBMAN   1,790,333
REAR GLARE GUARD
Filed Feb. 27, 1929   2 Sheets-Sheet 2
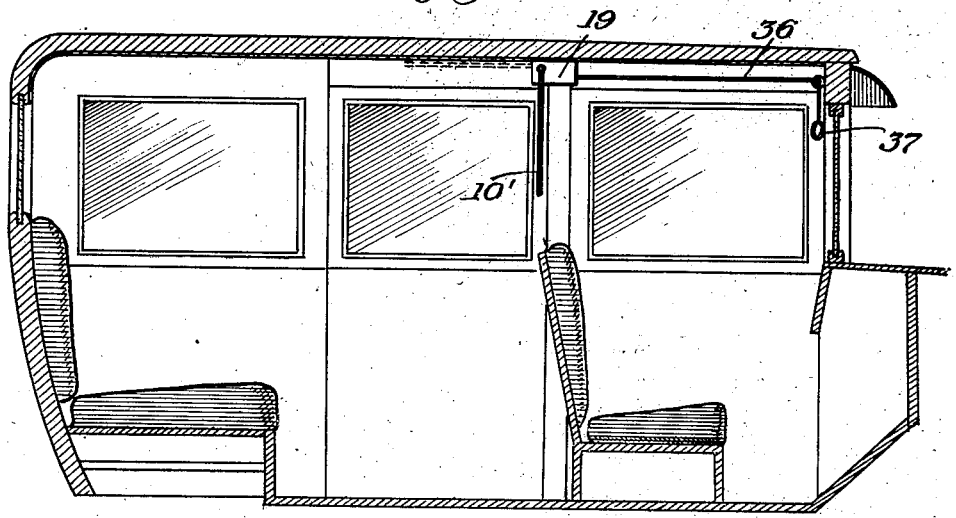
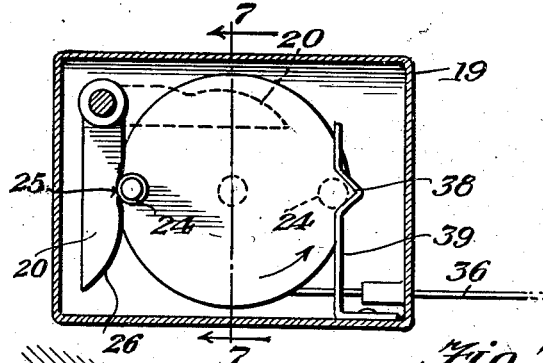
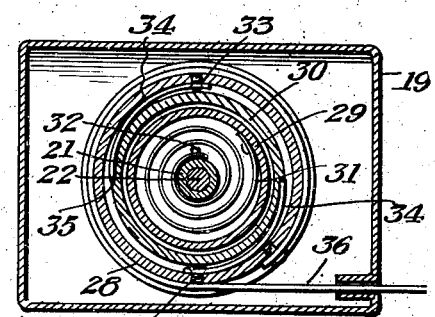
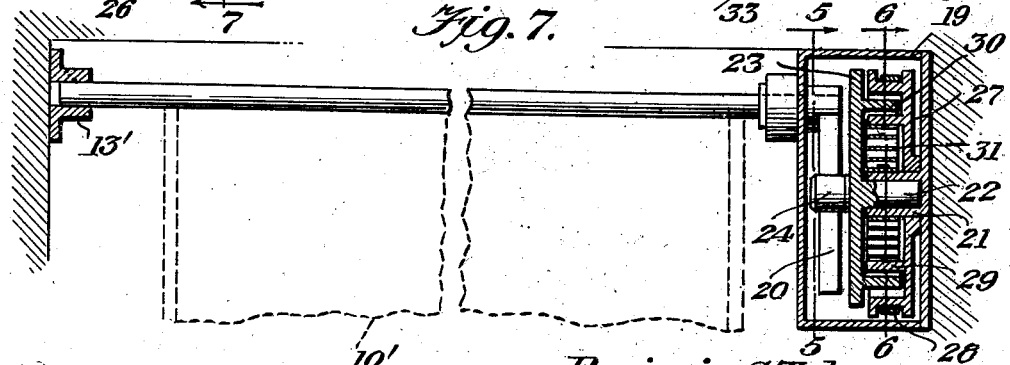
Benjamin S. Tubman
INVENTOR
BY Victor J. Evans
ATTORNEY Patented Jan. 27, 1931

1,790,333

UNITED STATES PATENT OFFICE

BENJAMIN S. TUBMAN, OF LITTLE COMPTON, RHODE ISLAND

REAR GLARE GUARD

Application filed February 27, 1929. Serial No. 343,129.

This invention relates to improvements in automobiles and has especial reference to anti-glare devices for cutting off the glare or reflection through the rear window of an automobile.

Another object of the present invention is the provision of means operable by the driver of an automobile for interrupting rays of light through the rear window, occasioned by the head lamps of automobiles at the rear, and for preventing said rays from being reflected in the rear vision mirror, windshield, or front windows, and thus relieve the driver from annoyance of this character.

Another object of the invention is the provision of means of the above character which may be readily controlled by the driver, so that the driver may quickly and conveniently adjust the device to cut off such rays, or to permit full rearward vision when desired.

With the above and other objects in view, the invention further includes the following novel features and details of construction, to be hereinafter more fully described, illustrated in the accompanying drawings and pointed out in the appended claims.

In the drawings:—

Figure 4 is a longitudinal sectional view through the body of an automobile showing a slightly different form of the invention.

Figure 5 is a section taken substantially on the line 5—5 of Figure 7.

Figure 6 is a like view on the line 6—6 of Figure 7.

Figure 7 is a fragmentary sectional view taken transversely of an automobile, the section being taken substantially on the line 7—7 of Figure 5.

Figure 1:
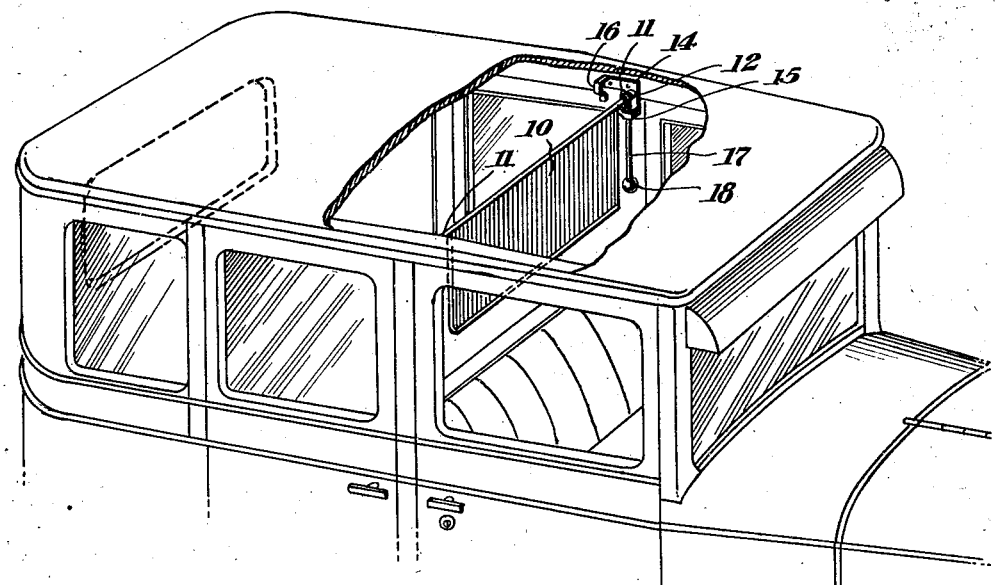
Figure 1 is a perspective view partly broken away illustrating the invention.
Figure 2:
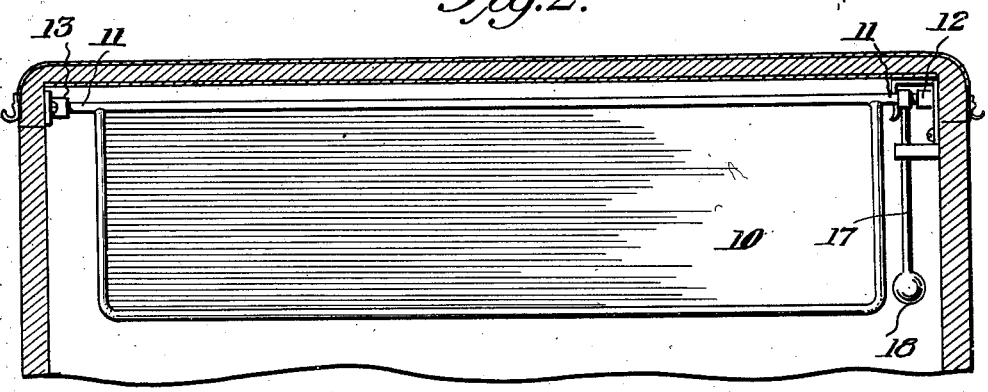
Figure 2 is a fragmentary transverse sectional view.
Figure 3:
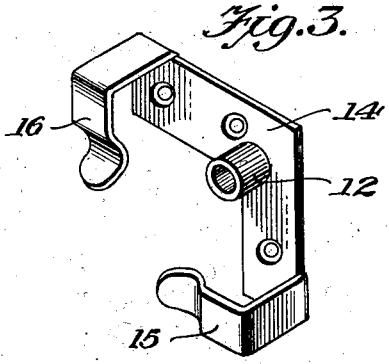
Figure 3 is a detail perspective view of one of the side brackets.

Referring to the drawings in detail and especially to Figures 1, 2 and 3, the invention as shown comprises a shield 10 which may be made of any suitable material. Extending from opposite ends of the shield are trunnions 11 and these trunnions are mounted in suitable bearings 12 and 13 which are mounted at opposite sides of the automobile body as shown in Figures 1 and 2 of the drawings.

The bearing 13 may consist of an attaching plate with a socketed member extending therefrom, while the bearing 12 consists of a socketed member which is carried by an angle plate 14 secured within the body of the automobile. This angle plate carries at opposite ends resilient fingers 15 and 16 which are spaced from the angle plate and may be made integral therewith.

Secured to and extending from one of the trunnions 11 is an arm 17. This arm is spaced from and parallel with one edge of the shield 10 and may carry a ball 18 at its outer end. This ball will serve both as a hand grip and weight.

The shield 10 may be arranged as shown in Figures 1 and 2 of the drawings so as to interrupt the rays of light which pass into the automobile through the rear window and prevent said rays from reaching the rear vision mirror, the windshield, or the side windows immediately adjacent the windshield. The shield is held in the position shown by engagement of the arm 17 with the spring finger 15.

When it is desired to move the shield to an inactive position, the arm 17 is moved rearward so as to engage the spring finger 16, whereupon the shield 10 will assume a horizontal position beneath the roof of an automobile. Due to the character of the fingers 15 and 16 and their engagement with the arm 17, the shield may be moved into and out of active position by the driver of the vehicle, and he will not be obliged to depend upon persons in the rear of the vehicle. Frequently an automobile is occupied only by the driver and the present invention renders it possible for the driver to conveniently control vision through the rear window.

In Figures 4 to 7 of the drawings, the shield which is indicated at 10′ has one of its trunnions mounted in a bearing 13′ while its other trunnion extends into a housing 19 secured within the automobile. An arm 20 located within the housing is rigid with this trunnion.

The housing 19 carries a sleeve 21 and rotatable within this sleeve is the stub shaft 22 of a disk 23 and this disk carries a stud 24 which is adapted to engage the arm 20. This arm is provided with a seat 25 to receive the stud and with a curved outer end 26 upon which the stud may ride.

Rotatable upon the sleeve 21 is a plate 27 which has an outer flange 28 and an inner flange 29, while extending from the disk 23 between these flanges 28 and 29 is a flange 30. Secured to the flange 29 is one end of a coiled spring 31, while the opposite end of this spring is secured to the sleeve 21 as shown at 32. Secured to the outer flange 28 at diametrically opposite points as shown at 33 are spring dogs 34. The free ends of these dogs engage diametrically located shoulders 35 provided in the outer periphery of the flange 30.

The outer periphery of the flange 29 is grooved and secured within this groove is one end of a flexible element 36 which extends through the casing 19 and has its outer end 37 located within convenient reach of the driver.

Assuming that the shield is positioned as shown by the dotted lines in Figure 4 of the drawings, a pull upon the end 37 of the flexible element 36 will rotate the plate 27. Rotation of this plate will likewise rotate the disk 23 through the dogs 34 so as to tension the spring 31. A half rotation of the disk 23 will cause the stud 24 to engage a seat 38 provided in the spring arm 39 so that further rotation of the disk 23 will be yieldingly resisted. When the stud 24 reaches the seat 38 and pull upon the flexible element 36 is relieved, the spring 31 will cause the plate 27 to return to its normal position. In the meantime, the weight of the shield 10' will cause it to assume the full line position shown in Figure 1, as the stud 24 has moved out of the path of the arm 20.

When it is desired to again raise the shield, the flexible element 36 is again pulled so that the stud 24 will ride upon the outer curved end 26 of the arm 20 and depress the latter until the stud engages the seat 25. The spring ratchet effect previously described will again occur during this operation.

The invention is susceptible of various changes in its form, proportions and minor details of construction and the right is herein reserved to make such changes as properly fall within the scope of the appended claim.

Having described the invention what is claimed is:—

In combination with an automobile, a shield positioned transversely behind the driver's seat, and means supporting the shield for adjustment into and out of active position, the said means comprising a bearing mounted at one side of the automobile body, a rod upon the upper edge of the shield mounted at one end in said bearing, a bearing, at the other side of the automobile, in which the other end of the rod is mounted, an arm fixed with respect to the last mentioned end of the rod and provided with a notch in one edge, a resilient arm, mounted opposite the first mentioned arm, and having a notch therein opposing the notch in the first mentioned arm, a disk mounted for rotation between the arms, a stud upon the disk engageable in the notches in the arms in different positions of rotative adjustment of the disk, a member rotatable with respect to the disk, a flexible pull element wound about the periphery of said member and constituting means whereby the member may be rotated, a spring connected with the said disk and tensioned by the rotation of the disk in one direction, and a resilient dog rotatable with the said member and coacting with the disk, in one direction of rotation of the member whereby to connect the said disk and member for rotation, in unison when the flexible element is pulled and permit return rotation of the said disk to normal position when the element is released.

In testimony whereof I affix my signature.

BENJAMIN S. TUBMAN.